March 29, 1927.
J. B. RHOADS
1,622,347
METHOD OF MAKING ORNAMENTAL CANDLES
Filed March 16, 1926   4 Sheets-Sheet 1
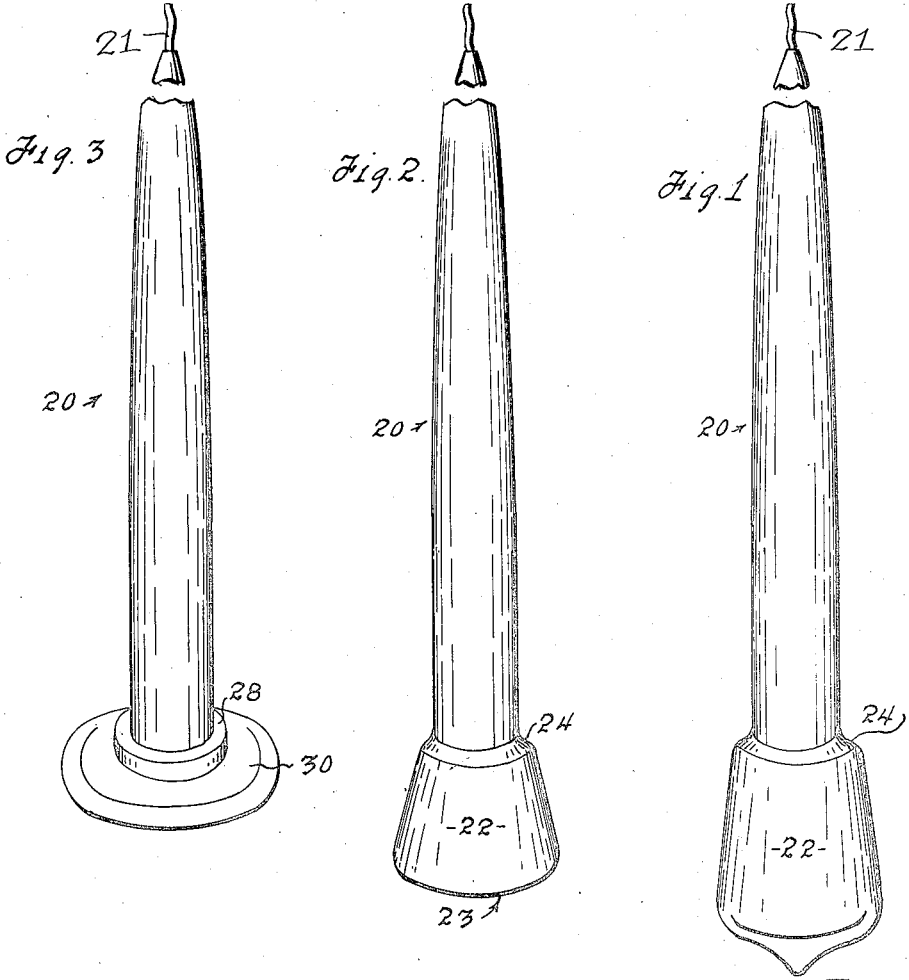
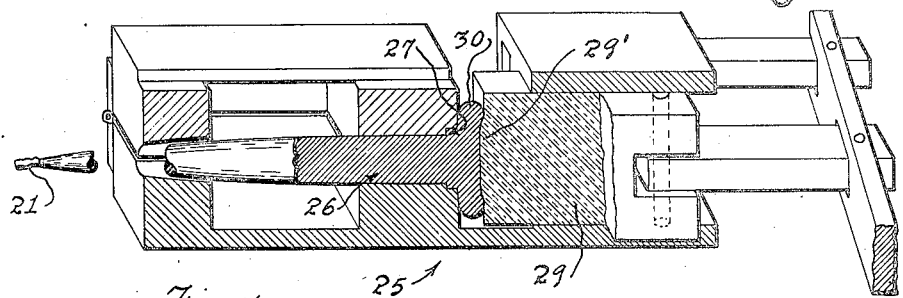
Jesse B. Rhoads
INVENTOR.
BY J. W. Sheely
ATTORNEY.

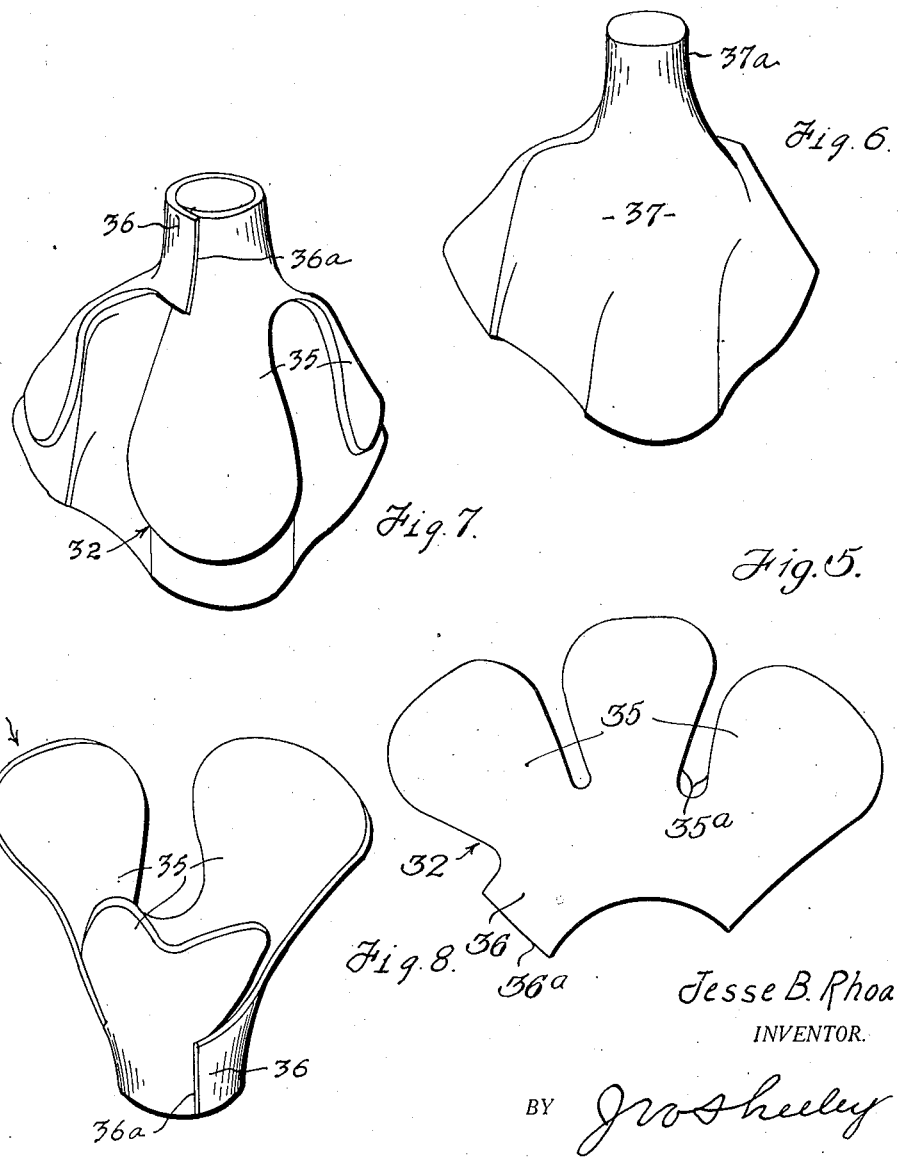

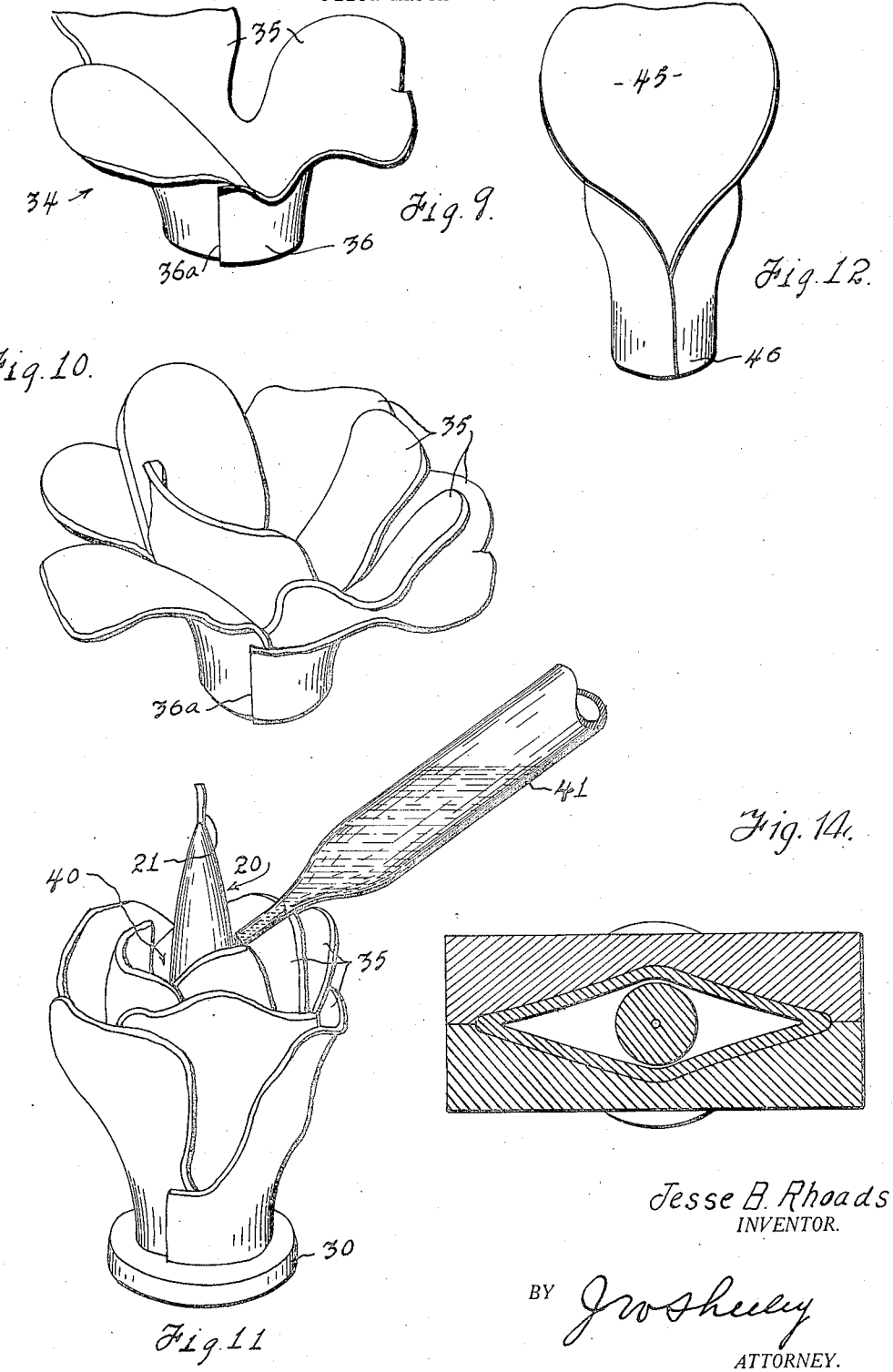

March 29, 1927.

J. B. RHOADS 1,622,347

METHOD OF MAKING ORNAMENTAL CANDLES

Filed March 16, 1926      4 Sheets-Sheet 4

Jesse B. Rhoads,
INVENTOR.

BY J. W. Sheely

ATTORNEY.

Patented Mar. 29, 1927.

1,622,347

UNITED STATES PATENT OFFICE.

JESSE B. RHOADS, OF LA JOLLA, CALIFORNIA.

METHOD OF MAKING ORNAMENTAL CANDLES.

Application filed March 16, 1926. Serial No. 95,111.

This invention relates to the method and means for the manufacture of ornamental candles and the like, and pertains more particularly to the manufacture of flower candles of the type set forth in my Patent No. 1,554,524, Sept. 22, 1925.

This invention has for its principal object the provision of economic and rapid production methods for manufacturing the above mentioned types of candles.

Since the intrinsic value of such products depends to a large extent upon their ornamental and artistic appearance, it is another and important object to provide for manufacturing the candles in large quantities at reasonable cost without sacrificing the artistic appearance and without lending an obvious machine-made appearance to the finished product.

The characteristic shapes of the flower candles set forth in said patent, and in fact the characteristic shape of all flower candles, coming within the scope of said patent, is such that they cannot be cast or moulded complete.

In carrying out the invention, various parts are separately formed and all are ultimately assembled, and it is another object to provide rapid and efficient means for assembling the parts permanently so that the assembly will remain intact until the candle is consumed.

In the said flower candles, the central part or pistil, is in the form of an operative candle, and it is another object of this invention to provide an improved method for the manufacture of an artistic candle particularly suited to serve such purpose.

Numerous other objects and advantages of my invention will appear hereinafter and these will be better understood because of the order in which they occur.

I have illustrated my invention by the accompanying drawings, in which:

Figure 1 is a view in elevation of the candle shaft as it appears in one of its steps of its manufacture.

Figure 2 is a similar view showing the candle after a subsequent operation has been completed.

Figure 3 is a similar view of the finished candle.

Figure 4 is a view in section of a mechanism for upsetting the base of the candle.

Figure 5 is a view in elevation of a blank used in the flower candle.

Figure 6 is a perspective of a mould used for forming such blank.

Figure 7 is a perspective of the blank as it appears when moulded.

Figure 8 is a perspective of the second moulded blank.

Figure 9 is a similar view of a third moulded blank.

Figure 10 is a perspective assembly view of the three moulded blanks.

Figure 11 is a similar view showing the moulded blanks assembled with the shaft; the view showing one of the later steps of the method for making a complete flower candle.

Figure 12 is a perspective of a moulded lily petal.

Figure 14 is a view in section on a line 14—14 of Fig. 15.

Figure 13:
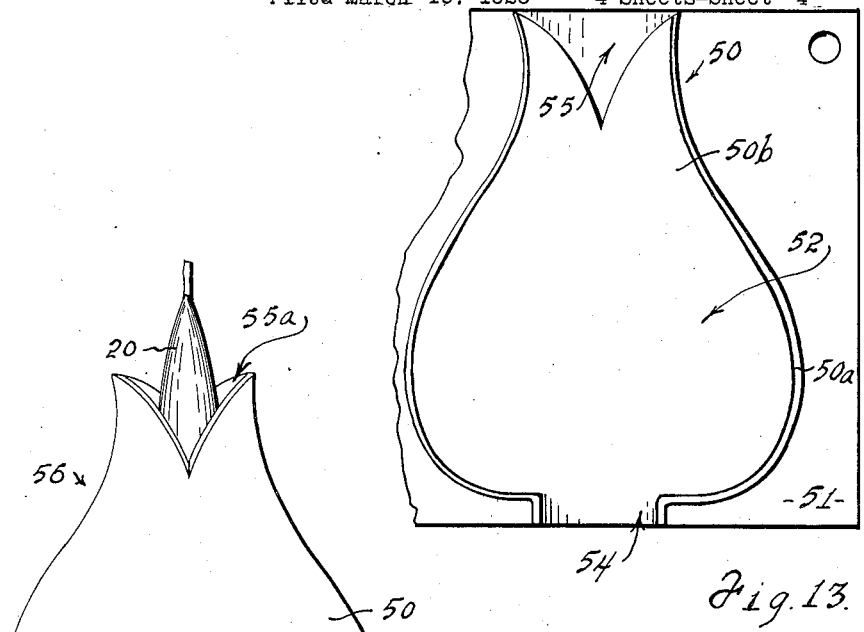
Figure 13 is a plan view of a moulded section with a blank in place, showing one of the first steps in making a form of flower candle hereinafter known as the bleeding-heart candle.

In carrying out my improved method, I provide a candle 20. For the purpose of providing a particularly artistic appearance, and in conformance with certain steps in the method, I provide a dipped candle, as shown in Fig. 1, rather than a moulded candle, although the latter type may be employed if desired. The wick 21 of the candle is repeatedly dipped in any usual manner until wax is built up around it to provide the candle form shown in Fig. 1. Subsequently, dipping is again repeated, but is confined to the lower end of the candle to build up a heavy butt end 22. The excess of this butt end is then removed leaving a comparatively smooth surface 23. Care is exercised in the last stage of dipping to provide the shoulder 24 at the upper termination of the butt end. Now the product is placed in the mould 25 with the shaft of the candle extending through a bore 26 thereof. At the lower end of this bore there is provided a counter bore 27 adapted to act to form a shoulder 28 on the finished candle. The mould includes a movable die 29 which has a portion 29' which is of smaller diameter than the finished base 30 of the candle. This die is caused to move inwardly toward the candle to upset the butt end thereof. It should be explained here, that just prior to placing the candle in the mould for upsetting, the said candle is removed from a bath of warm water or the like, which maintains the candle at such a temperature that it is quite flexible. In the case of paraffin base waxes, such as I employ, this temperature is maintained at about 105 degrees Fahrenheit. When the die is moved inwardly some of the flexible wax of the butt is forced and moulded into the counter bore of the mould to form the shoulder. The remainder of the butt is displaced outwardly in all directions by the inward movement of the die, but the displacement of the said remainder of the butt is not confined. The result is the generally circular base 30. Due to the fact that this base is formed by natural and unrestrained displacement of the wax, it is characterized by an artistic and hand made appearance, rather than possessing the stereotype characteristic of a machine made product. The die portion 29′ being smaller in diameter than the finished base, provides the base with a slightly concave surface, whereby it will rest more evenly on any plane surface.

To form the corolla of the rose, I provide sheets of wax, (not shown), which are rolled or otherwise formed to the requisite thickness. By means of any suitable cutter or die (not shown), these sheets are cut to form a plurality of blanks 32. These blanks are arcuate in form, and in the form of flower shown in Figs. 10 and 11, three blanks, 32, 33 and 34, respectively, are provided. Each blank includes a plurality of petals 35, and each of the petals is purposely of a different shape. The margins 35ᵃ of the petals are separated from each other, but all the petals of a blank are connected to each other by an integral band 36, having an end 36ᵃ extended beyond the last petal. The purpose of the extended end 36ᵃ will be explained hereinafter.

In the manufacture of the rose, I provide, in this instance, three forms, such as 37, one for each of the three blanks or groups of petals. After the blanks are cut they are immersed and maintained in a fluid bath, preferably water of the correct temperature. Blank 32 is first removed and shaped around the form as shown in Fig. 7. Such shaping is done by the fingers of the workman and is easily and quickly accomplished by reason of the pliability of the warm wax blank. The band 36 of the blank is formed around the neck 37ᵃ of the form, as shown, with the extent 36ᵃ lapped over and welded to the opposite end of said band. The warm wax extent readily adheres to and welds with any other part of the blank with which it comes in contact. When the opposite ends of the band are so joined, the band forms an annular base for each shaped blank. Each successive one of the three forms employed is so proportioned that each successive blank is provided with an annular base of larger diameter than the preceding, so that the petal groups may nest in each other. Each of the forms is arranged to give each petal a different and characteristic form so that all of the nine petals are individual as to outline and curvature.

The three petal groups, while still warm, are removed from their respective forms and are nested together around the candle. The annular lower part of the innermost petal group rests on the shoulder above the base of the candle. The next outermost group fits quite snugly around the shoulder, while resting on the base, and the annular lower end of the outermost group is so shaped, by the form from which it is removed, that it fits around the juxtaposed group and rests entirely on the base.

The shoulder, at the juncture of the shaft and base of the candle, strengthens the candle at this point and provides for quite accurately fitting the successive petal groups so that no unduly large spaces appear. The petal groups, when first assembled around the base, provide the partially finished rose product shown in Fig. 10.

Now, while the wax is still warm a skillful operator deftly tucks each and all of the petals inwardly into the more artistic and closer arrangement of petals shown in Fig. 11. Since the petals are partially bent and shaped by the forms on which they are shaped, subsequent inward bending of the petals is easily accomplished. In the finished and artistic product, the petals are shown as so arranged as to preclude their being fully shaped in one operation, and in fact I find it advantageous for assembly, and for the sake of final appearance, to only partially shape the petals before assembling them around the candle.

The petal groups now partially enclose a space or cavity 40 around the shaft, which cavity is practically fluid tight at the lower end because of the comparatively close fit of the annular bases of the petal groups around the shaft. In further carrying out my method, I employ a suitable charging tube or dropper, which is charged with quite hot wax in fluid form. A few drops of this hot wax (see Fig. 11) is introduced to the said space and allowed to flow wherever it will. The hot fluid wax is very penetrating and finds its way into the small spaces which may exist between the lower connected ends of the assembled units of the product. This hot wax thoroughly welds and joins all parts into a complete integral unit. When the flower candle is burning the inner petal group, and the seal provided by the prior introduction of wax, retains all drip from the candle and melting petals, and maintains same in proximity to the wick until it is all efficiently burned to produce illumination.

In arranging the nested petal groups, each petal of one group is arranged midway between the adjacent petals of an adjacent group so that the finished and assembled arrangement of petals provides a practically fluid tight cupped cavity around the shaft. Such cavity and the close juxtaposed relation of the petals prevents any drip from coming out between the petals while the candle is burning and while the petals are melting or wilting.

In the manufacture of a flower candle to represent a calla lily, I provide a suitable single blank 45, shaped around a suitable form (not shown), and providing an annular lower portion 46. Thus shaped the monopetal, when fitted around the finished candle shown in Fig. 3, and welded thereto by hot wax, provides the complete lily candle, such as described in the above mentioned patent. The lily is technically known as a monopetalous flower, while the rose is a polypetalous flower, but for convenience of manufacture of the rose, I provide a plurality of what appears to be separate petals, in a single unit. The manufacture of the lily differs from the manufacture of the rose only in that the lily has one petal unit, while the rose or like polypetalous flowers, possesses a plurality of nested annular petal units.

Figure 16:
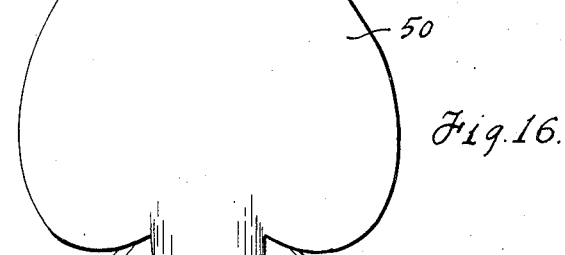
Figure 16 is a view in elevation of the complete bleeding-heart candle.
Figure 15:
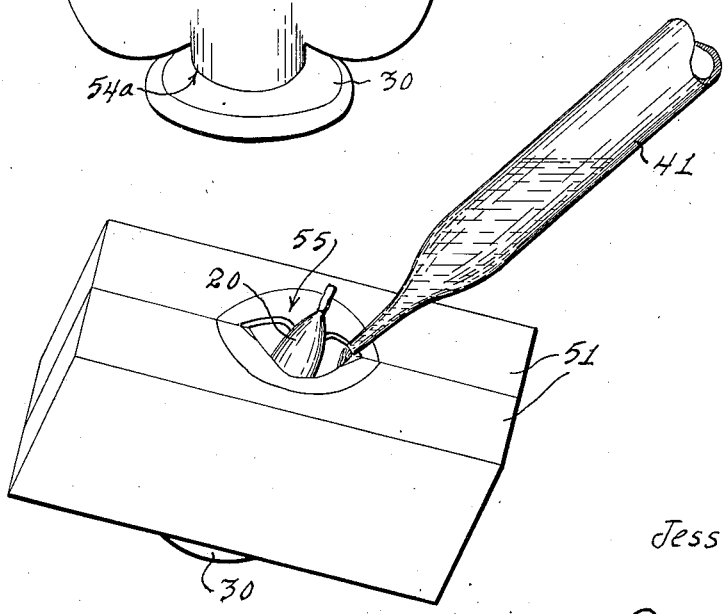
Figure 15 is a perspective of the complete mould used in making the bleeding-heart candle.

In the manufacture of the bleeding heart flower shown in Figs. 13 to 16, inclusive, I provide two flat blanks 50 and a pair of interlocking mold members 51. Each blank is taken from a warm fluid bath and is pressed into a corresponding cavity 52 in the mold. The warm flexible blank is pressed into the cavity by the workman's finger tips until it has taken the shape of the cavity. After the two blanks are so treated, the two mold sections are pressed firmly together. When the blank is cut it provides a square cut upper corner 50ª perimetrically of the blank. When the blank is pressed into the mold the inner surface 50ᵇ is shorter than the opposite surface, and the result is that the said corner 50ª projects above all other parts of the blank. When the mold sections are pressed together, corresponding edges 50ª abut first and insure a comparatively fluid tight joint. The lower end of cavity 52 extends into a cavity 54 of semi-circular cross section. At the upper end, cavity 52 extends into another cavity 55. Cavities 54 and 55 each extend to corresponding ends of the mould and provide for inserting a candle shaft through the mould while the blanks are in place. When the blanks are pressed together the complete product is a cupped or hollow corolla 56, open at each end, as at 54ª and 55ª. Opening 54ª and the material around it provide a tubular extension similar to that characteristic of the other corolla units previously described. When the candle is inserted, this tubular extension fits snugly around the base of the shaft and its lower end comes into abutment with the shoulder of the candle. Hot wax is then introduced to the upper open end of the mold and same is variously tilted to wash the hot wax into all existing crevices (see Fig. 15). Thus the two blanks are welded to each other and to the candle, and the finished product is characterized by a substantially fluid tight interior space, open only at the top. When this form of candle burns, all drip and the wax melted from the corolla flows into said space and is retained therein until ultimately consumed.

While I have shown and described specific forms of flower candles and have described specific types of procedure in carrying out my method, I do not wish to be limited to the specific procedure described; the full scope of my invention being defined by the appended claims.

I claim:

1. The method for making a candle with an integral supporting base, which method consists in forming a wax candle with an elongated end of enlarged diameter, heating the same to a temperature sufficient to render the wax flexible, and forcing the lowermost part of the enlarged end inwardly to cause the wax to be displaced laterally radially without restraining such lateral displacement.

2. The method for making a candle with an integral supporting base, which method consists in dipping a wick repeatedly in molten wax to provide a candle, dipping the lower end of the shaft in molten wax to build up an enlarged elongated end, heating the end to a temperature to render it flexible, and pressing a die, having a portion of not greater diameter than said end, against the end longitudinally to cause lateral radial displacement thereof.

3. The method for making a candle with an integral supporting base, which method consists in dipping a wick repeatedly in molten wax to provide a candle, dipping the lower end of the shaft in molten wax to build up an enlarged elongated end, heating the end to a temperature to render it flexible, and pressing a die, having a portion of not greater diameter than said end, against the end longitudinally to cause lateral unrestrained radial displacement thereof.

4. The method for making a candle with an integral supporting base, which method consists in forming a candle with a shaft and an enlarged elongated lower end to provide a shoulder at the juncture of the shaft and its enlarged lower end, causing the shaft to protrude through an apertured member having a surface surrounding said aperture, with the said shoulder in abutment with said surface, and pressing an object against the outermost end of the enlarged part of the shaft to displace the wax thereof radially outward.

5. The method for manufacturing flower candles, which method consists in providing a candle shaft with a base and a shoulder at the juncture of said base and shaft, forming a wax cupped corolla apart from said shaft, with an apertured lower portion, passing the shaft through the aperture of the corolla, until the corolla is in abutment with said shoulder, and pouring molten wax in the cupped corolla and allowing said wax to flow to points adjacent said shoulder.

6. The method for making a flower candle, which method consists in providing a candle, providing a flat wax corolla blank with opposed margins, heating the blank to render same flexible, shaping the blank around a form and bringing the opposed margins into welded juxtaposition to provide a cupped corolla having an apertured lower portion, passing the candle partially through said aperture, and pouring molten wax into said cupped corolla.

7. The method for making a wax flower candle of the class described, which method consists in providing a flat wax blank, providing a bell shaped form terminating at the upper end in a circular neck, heating the blank to render it flexible, shaping the blank around the form to provide a cupped corolla having a lower tubular extension, providing a candle with a circular shaft and fitting the tubular extension around said shaft.

8. The method as in claim 7, and further consisting in pouring molten wax into the cupped corolla around the shaft.

9. The method for making a wax flower candle of the class described, which method consists in providing a flat wax blank, providing a bell shaped form terminating at the lower end in a circular neck, heating the blank to render it flexible, shaping the blank around the form to provide a cupped corolla having a lower tubular extension, providing a candle with a shaft, and a shoulder adjacent the lower end of said shaft, passing the shaft of the candle through the tubular extension of the corolla until the said extension is in abutment with said shoulder, and causing the tubular extension to become welded to said shaft.

10. The method for manufacturing a flower candle of the class described, which method consists in providing a thin wax corolla blank to include a flat arcuately arranged band having petals projecting radially therefrom, heating the blank to render it flexible, shaping the blank while hot to provide a cupped corolla having a tubular extension, fitting the extension around a candle shaft, and welding said tubular extension to said shaft.

JESSE B. RHOADS.